Figure 1:
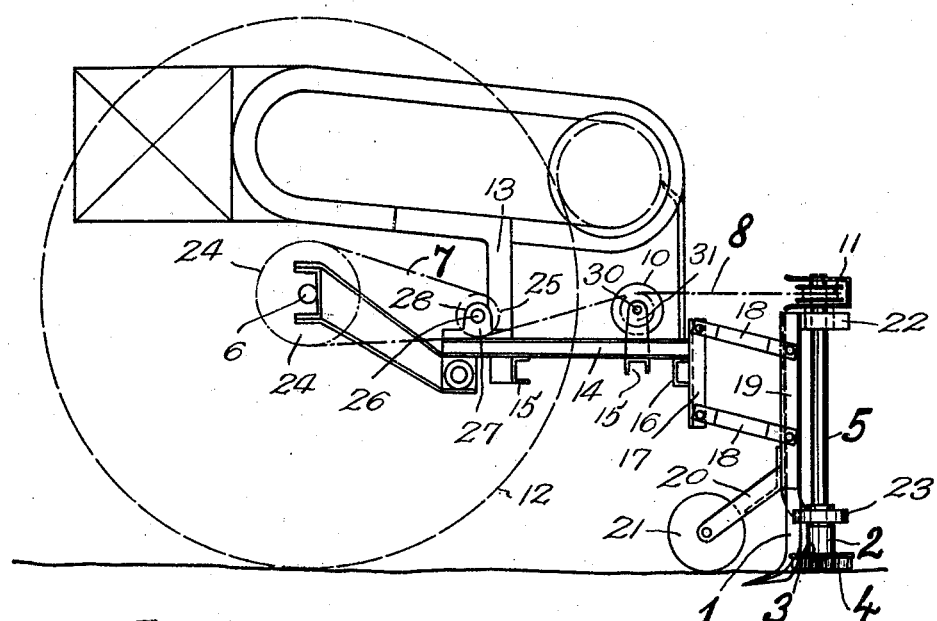

Dec. 13, 1932.  A. FRANK  1,890,537

HOE

Filed Dec. 19, 1928

Inventor:
Armin Frank.

Patented Dec. 13, 1932

1,890,537

UNITED STATES PATENT OFFICE

ARMIN FRANK, OF ILBERSTEDT, GERMANY

HOE

Application filed December 19, 1928, Serial No. 327,122, and in Germany June 25, 1928.

This invention relates to hoes known as wheeled hoes.

Wheeled hoes of the known type are adapted solely for destroying the weeds growing between the rows of plants, whereas such weeds as grow in the line of the rows cannot be eradicated. This circumstance is manifested in a particularly inconvenient manner in the case of young cereal plants. Attempts have been made to pull out the weeds growing in the line of the row by means of harrows attached to the hoe; but the results are for from satisfactory, since, even in this case, practically nothing but the weeds situated between the rows are eradicated by the blades of the hoes. Consequently, wheeled hoes have hitherto cleared only about one half of the surface of the soil from weeds.

According to the present invention, all of the weeds can be eradicated, and this is accomplished by disposing between each pair of hoe blades, that is to say, in the lines of the rows of plants, weed eradicators which travel immediately over the surface of the soil and are provided with weed removing blades, attached to vertical shafts which rotate about a vertical axis.

In contrast to the still young stalks of the crop plants, about two-and-a-half inches to three-and-a-half inches in height, the weeds as charlock or other brassicaceous weeds which grow usually in the form of tufts, that is to say, the leaves are in the form of a crown, so that the thrust of the blades against the tufts forces the weeds—roots and all—out of the soil, whilst the stalks of the crop plants are merely bent over temporarily by the blades or eradicator which sweep over them without injury to the plants.

In order to facilitate the uprooting of the weeds, the eradicator blades are located rear of the hoe blades and between the same the soil between the rows being in a loosened condition before the rotary and longitudinally curved eradicators come into effective action.

This invention relates to certain new and useful improvements in wheeled cultivators or plows, the object of my invention being to provided means whereby a transverse gang of cultivators is associated with trash clearers or weed eradicators, the cultivators being attached by means of parallel rule frames with a wheel frame, the parts being af such construction that the cross gang of plows or cultivator blades may be adjusted to enter the soil to the desired depth, and that the weed or trash clearers will operate over the surface of the soil to remove therefrom weeds, clods and trash which may be in line with the soil, without disturbing the level thereof or the growing plants.

A further object of my invention is to provide a cultivator with horizontally rotary blades for removing material from the lines of growing plants, which blades operate rearward of the plows and above the seeded rows and plants, to-wit: behind and between the line of travel of the plows, as well as above the portions of the plows which enter the soil. The trash and weed removers comprise horizontally maintained and longitudinally curved blades which are mounted upon the ends of vertically maintained parallel and rotative shafts, the lower edges of the blades being positioned at or above the soil.

In the accompanying drawing which illustrates my invention,—

Figure 2:
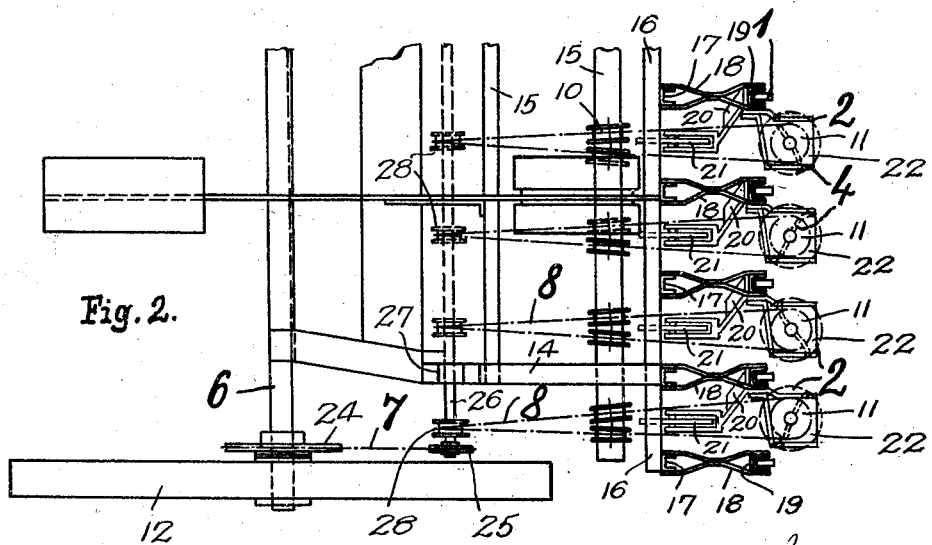

Figure 1 is a side elevation and Figure 2 is a partial plan view.

The cultivator is provided with the usual wheels 12 mounted fixedly on an axle 6 and suitably supported beneath the usual frame 13 is a supplemental frame having longitudinally extending side members 14 and transverse members 15 connecting said side members. This supplemental frame is positioned rearwardly of the axle and extending transversely thereof at the rear ends of the members 14 is a rear transverse member 16. Vertical frame members 17 are spaced laterally from each other and are firmly fixed to the member 16. To the upper and lower ends of each member 17 are pivoted the forward ends of a pair of parallel links 18 which have their rear ends pivotally connected to a respective standard 19. Extending downwardly and forwardly from each of the members 19 is an arm 20 on which is mounted a ground wheel 21. On the lower end of each member 19 is carried a ground working tool or cultivator blade 1. By reason of the pivotal linkage, the members 19 are vertically movable with respect to the supplemental frame and move up and down as the ground wheels 21 move over the inequalities of the ground. Fixed to the upper end of each member 19 is a bearing 22 and a similar bearing 23 is also fixed to each member 19 below the arm 20. These bearings on each member 19 support a shaft 5 rotatably. Each shaft has fixed to its lower end a hub 2 carrying a disc 3 below which are mounted curved blades or eradicators 4. On the upper end of each shaft is fixed a belt pulley 11. Fixed on the axle 6 is a sprocket wheel 24 which is connected by a sprocket chain 7 with a sprocket wheel 25 fixed on a shaft 26 extending transversely of the supplemental frame and supported in bearings 27 mounted on that frame. By this means the shaft 27 is driven as the cultivator is moved forwardly over the ground. Fixed on the shaft 26 directly forward of each pulley 11 is a belt pulley 28 which is connected by a belt 8 with the respective pulley, the belt being given a quarter turn in its passage rearwardly and being led over idler pulleys 10 revolubly mounted on a shaft 30 supported in bearings 31 carried by the supplemental frame.

It will now be observed that the shafts 5 will be carried to rotate as the cultivator moves forwardly and that the ground wheels or surface engaging rollers act to maintain the cultivator blades at a proper distance below the ground level and the eradicator blades properly above ground. Also, since the vertical motion of the shaft 5 is not great the belts 8 will maintain their positions on the pulleys 11, the latter being flanged to prevent the belts running off.

I claim:

1. A cultivator comprising a sulky frame and a transverse row of spaced apart cultivators associated with said frame, in combination with vertically movable frames, each of said vertically movable frames maintaining a horizontally rotary blade, and a surface engaging roll in advance of said rotary blade.

2. In combination with a sulky frame having a plurality of straddle row cultivators associated therewith, of horizontal rotary blades, and surface engaging rollers maintained in advance of the rotary blades said rollers controlling the vertical movement of the blades.

3. A cultivator comprising a frame having a plurality of longitudinally curved blades mounted for rotation on vertical axes carried by the frame and adapted to be moved over the surface of the soil above a row of plants, and means associated with the supports in advance of the blades to restrict the vertical movement thereof by engagement with the soil.

4. A cultivator comprising a frame mounted on wheels, vertically movable and rearwardly extending frames provided with bearings for vertical shafts, means for driving said shafts from the supporting wheels of the frame, rotary blades attached to the lower ends of the vertical shafts, and means in advance of the blades for restricting vertical movement of the frames with which the rotary blades are associated.

In testimony whereof he affixes his signature.

ARMIN FRANK.